United States Patent [19]
Bedouet et al.

[11] Patent Number: 5,559,438
[45] Date of Patent: Sep. 24, 1996

[54] COMPOSITE SAFETY SWITCH

[75] Inventors: Bernard Bedouet, Bourg-Les-Valence; Christophe Taurand, Valence, both of France

[73] Assignee: Sextant Avionique, Meudon-La-Foret Cedex, France

[21] Appl. No.: 377,733

[22] Filed: Jan. 25, 1995

[30] Foreign Application Priority Data

Jan. 31, 1994 [FR] France .................. 94 01305

[51] Int. Cl.⁶ .............................................. H03K 19/007
[52] U.S. Cl. .......................... 324/418; 324/422; 340/644
[58] Field of Search ........................ 376/216, 245, 376/259; 324/418, 420, 421, 422, 423; 340/644

[56] References Cited

U.S. PATENT DOCUMENTS

| | | |
|---|---|---|
| 4,664,870 | 5/1987 | Hager . |
| 4,687,623 | 8/1987 | Cook . |
| 4,696,785 | 9/1987 | Cook et al. . |
| 4,697,093 | 9/1987 | Sutherland et al. . |
| 4,843,537 | 6/1989 | Arita ........................................ 376/215 |
| 4,980,573 | 12/1990 | White et al. . |
| 5,006,301 | 4/1991 | Lexa ......................................... 376/216 |
| 5,272,441 | 12/1993 | Wright ..................................... 324/422 |

FOREIGN PATENT DOCUMENTS 3732079  4/1989  Germany .

Primary Examiner—Kenneth A. Wieder
Assistant Examiner—Jose M. Solis
Attorney, Agent, or Firm—Lowe, Price, LeBlanc & Becker

[57] ABSTRACT

A composite switch is constituted by a series or parallel association of at least two simple switches. Each simple switch includes an element for measuring the current in the simple switch in the case of a parallel association; an element for measuring the voltage across the simple switch in the case of an association in series; and a control circuit receiving the information provided by the measuring elements as well as a control signal from the simple switch, and providing an active failure signal if the measured voltage is high or the measured current is low while the simple switch is controlled to be turned on, or if the measured current is high or the measured voltage is low while the simple switch is controlled to be turned off.

11 Claims, 7 Drawing Sheets

| config. | A | S1 | S2 |
|---|---|---|---|
| 1 | 0 | 0 | 0 |
| 2 | 1 | 1 | 0 |
| 3 | 1 | 0 | 1 |
| 4 | 1 | 1 | 1 |

Fig 3A

| config. | B | S1 | S2 |
|---|---|---|---|
| 1 | 0 | 0 | 0 |
| 2 | 0 | 1 | 0 |
| 3 | 0 | 0 | 1 |
| 4 | 1 | 1 | 1 |

Fig 3B

| config. | C' | S1 | S2 | S3 | S4 |
|---|---|---|---|---|---|
| 1 | 0 | 0 | 0 | 0 | 0 |
| 2 | 0 | 1 | 0 | 0 | 0 |
| 3 | 0 | 0 | 1 | 0 | 0 |
| 4 | 1 | 1 | 1 | 0 | 0 |
| 5 | 0 | 0 | 0 | 1 | 0 |
| 6 | 0 | 1 | 0 | 1 | 0 |
| 7 | 0 | 0 | 1 | 1 | 0 |
| 8 | 1 | 1 | 1 | 1 | 0 |
| 9 | 0 | 0 | 0 | 0 | 1 |
| 10 | 0 | 1 | 0 | 0 | 1 |
| 11 | 0 | 0 | 1 | 0 | 1 |
| 12 | 1 | 1 | 1 | 0 | 1 |
| 13 | 1 | 0 | 0 | 1 | 1 |
| 14 | 1 | 1 | 0 | 1 | 1 |
| 15 | 1 | 0 | 1 | 1 | 1 |
| 16 | 1 | 1 | 1 | 1 | 1 |

Fig 3C

| config. | C' | S1 | S2 | S3 | S4 |
|---|---|---|---|---|---|
| 1 | 0 | 0 | 0 | 0 | 0 |
| 2 | 0 | 1 | 0 | 0 | 0 |
| 3 | 0 | 0 | 1 | 0 | 0 |
| 4 | 1 | 1 | 1 | 0 | 0 |
| 5 | 0 | 0 | 0 | 1 | 0 |
| 6 | 0 | 1 | 0 | 1 | 0 |
| 7 | 1 | 0 | 1 | 1 | 0 |
| 8 | 1 | 1 | 1 | 1 | 0 |
| 9 | 0 | 0 | 0 | 0 | 1 |
| 10 | 1 | 1 | 0 | 0 | 1 |
| 11 | 0 | 0 | 1 | 0 | 1 |
| 12 | 1 | 1 | 1 | 0 | 1 |
| 13 | 1 | 0 | 0 | 1 | 1 |
| 14 | 1 | 1 | 0 | 1 | 1 |
| 15 | 1 | 0 | 1 | 1 | 1 |
| 16 | 1 | 1 | 1 | 1 | 1 |

Fig 3D

C type

C' type

COMPOSITE SAFETY SWITCH

BACKGROUND OF THE INVENTION

1. Field of the Invention

The present invention relates to safety switches, that is, switches for providing fail-safe switching of a load in an environment where, for safety purposes, it is extremely important that the load be supplied or not when the switch is operated.

An example of such an environment is an aircraft, for which it is essential to activate suitable elements as soon as the pilot or a computer acts on the corresponding switches. The failure of a switch, for example the absence of switching when the switch is operated, or a spurious switching, may have dangerous consequences.

SUMMARY OF THE INVENTION

An object of the present invention is to provide a safety switch which is particularly reliable while requiring low maintenance.

To achieve this object, the present invention provides a composite switch constituted by a series or parallel association of at least two simple switches. Each simple switch includes a component for measuring the current in the simple switch in the case of a parallel association; a component for measuring the voltage across the simple switch in the case of an association in series; and a control circuit receiving the information provided by the measuring components as well as a control signal from the simple switch, and providing an active failure signal if the measured current is low or the measured voltage is high whereas the simple switch is controlled to be turned on, or if the measured current is high or the measured voltage is low whereas the simple switch is controlled to be turned off.

According to an embodiment of the invention, each simple switch arranged in series has a high value resistor connected in parallel.

According to an embodiment of the invention, the failure signal is active only if the measured voltage is high whereas the simple switch is controlled to be switched on or if the measured current is high whereas the simple switch is controlled to be off.

The present invention also provides a method for testing a composite switch of the above-mentioned type, including the steps of switching the simple switches of the composite switch without modifying the conductive state of the composite switch, and of reading the failure signals of the control circuits.

The foregoing and other objects, features, aspects and advantages of the invention will become apparent from the following detailed description of the present invention when taken in conjunction with the accompanying drawings.

BRIEF DESCRIPTION OF DRAWINGS

FIGS. 3A–3D are tables recapitulating the states of the composite switches of FIGS. 1A–1D as a function of the states of each of their simple switches;

DETAILED DESCRIPTION

The present invention is based on the use of redundant switches to ensure that a composite switch, constituted by these redundant switches, fulfills its function with a high reliability.

Figure 1A:
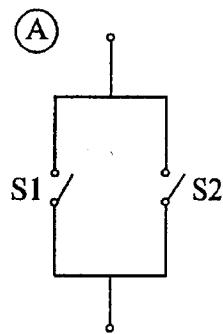
FIGS. 1A–1D represent various types of composite switches providing a high reliability due to redundancy.

FIG. 1A represents an A-type composite switch for providing a high reliability at the switching-on. Such a switch is adapted to control a load which should be fed and which can be left on the on-state if the composite switch fails.

The composite switch A includes two parallel connected simple switches S1 and S2. Initially, switches S1 and S2 are switched off. When it is desired to feed the load, one of the switches, for example S1, is switched on. If the switch S1 is defective and cannot be turned on, the load is fed by switching-on switch S2. It is also possible to switch on both switches S1 and S2 for switching-on the load. In this case, if one of the switches cannot switch on, the other switch ensures switching-on.

In contrast, if one of the switches S1 or S2 is defective and remains on, the load is permanently fed. For this reason, it is essential with this type of composite switch that a spurious supply of the load be without inconvenience. This type of composite switch is referred to as an on-safe switch.

Figure 1B:
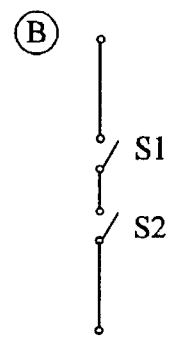

FIG. 1B represents a B-type, off-safe composite switch. This type of switch is used when it is important that the load be powered off when one acts on the switch, whereas a spurious powering-off of the load is acceptable. The composite switch includes two simple switches S1 and S2, connected in series.

Initially, the two switches S1 and S2 are switched on, and the load is fed. To set the load off, one of the switches, for example S1 is switched off. If the switch S1 is defective and remains on, switch S2 is turned off. Also, to power off the load, the two switches S1 and S2 can be off. Then, if one of the switches remains closed in case of failure, the load is powered off by the other switch.

Figure 1C:
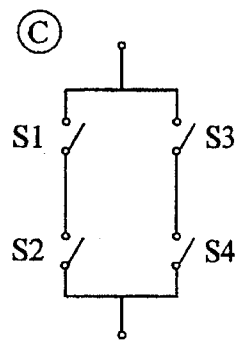

FIG. 1C represents a C-type composite switch that is on- and off-safe, the switching-off priority being higher than the switching-on priority. This type of switch is used when it is essential that the load should be powered off when the switch is turned off.

The composite switch C includes two B-type parallel-connected composite switches S1/S2 and S3/S4. The composite switch no longer ensures its function only if at least two of its simple switches fail to operate in a predetermined way. The failure possibilities are as follows:

the composite switch remains switched on if switches S1 and S2 are switched on or if switches S3 and S4 are switched on; and the composite switch remains switched off for one of the switched off switch pairs S1/S3, S2/S4, S2/S3, and S1/S4.

The possible failure of other pairs does not cause the composite switch to misfunction. The occurrence of a spurious switching off of the composite switch is more probable than the occurrence of a spurious switching on, since the number of defective pairs causing this failure is higher than the number of defective pairs causing the inverse failure. For this reason, the composite switch conventionally has a switching off priority higher than a switching on priority.

Figure 1D:
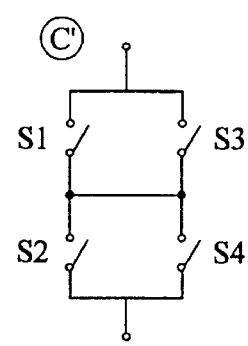

FIG. 1D represents a C'-type composite off- and on-safe switch, the on priority being higher than the off priority. The C' switch includes two A-type composite switches, S1/S3 and S2/S4, connected in series. The possible failure states of this switch are as follows:

the composite switch remains on if the switch pairs S1/S2, S1/S4, S3/S2 and S3/S4 are on; and the composite switch remains off if switches S1 and S3 are off or if switches S2 and S4 are off.

There is a higher probability for the composite switch C' to remain switched on in case of failure since the number of defective pairs causing this failure is more important than the number of defective pairs causing the inverse failure.

The simple switches S of any of the above-mentioned composite switches can be all off or all on to switch the composite switch off or on, which causes the failures of the simple switches to be automatically hidden, i.e., the composite switch continues to ensure its function even though one (or more than one for the C and C' types) of its simple switches is defective. Since two simple switches must fail to operate before the composite switch fails to operate, the probabilities the composite switch will fail to operate is equal to the product of the failure probabilities of the two simple switches.

If one of the simple switches fails to operate, it must be detected (even if its failure is not apparent) and replaced in order that the composite switch operates with its full reliability.

Figure 2A:
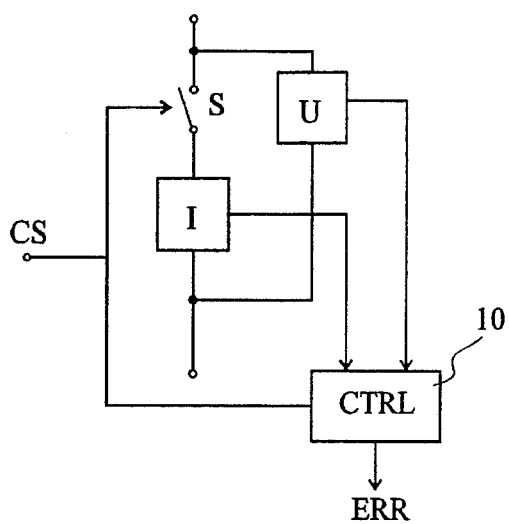
FIG. 2A represents an embodiment of a simple switch being part of a composite switch according to the invention.

FIG. 2A represents an embodiment of a simple switch according to the invention, to be integrated in a composite switch, for detecting a failure and for signaling this failure so that an observer can replace this simple switch.

Each simple switch S of a composite switch according to the invention includes a component I which measures the current flowing through switch S, and a component U which measures the voltage across the terminals of switch S and component I. The voltage could also be directly measured across switch S. However, the represented configuration allows, for a voltage measurement, to simultaneously check switch S and the current measuring component I. The measured voltage and current are supplied to a control circuit 10 which provides a failure signal ERR when failure of switch S is detected. This failure signal ERR is, for example, processed by a computer which controls the switches, to gather the information on the switch failure and to indicate them to the user. The control circuit 10 also uses a signal CS controlling switch S, which is, for example, a signal provided by a computer.

When switch S is switched on, the voltage measured by the element U is practically null, and the current measured by the element I is non-null if a load is connected to the switch. If switch S is off, the voltage measured by element U is high, that is, close to the supply voltage of the load, and the current measured by element I is zero.

Thus, the control circuit 10 indicates an on-failure of switch S if the measured current is non-zero, whereas signal CS is in a state for selecting the switching-off of switch S. An on failure could also be indicated if the measured voltage were zero, but this measurement would trigger a spurious failure indication if the load was not connected, or connected in parallel with another switched on switch.

The control circuit 10 indicates an off-failure of switch S if the measured voltage is high whereas signal CS is in a state for selecting the closing of switch S. An off failure could also be indicated if the measured current were zero, but this measurement would trigger a spurious failure indication if a load was not connected, or was connected in series with another switched off switch.

In addition, by measuring both the current and the voltage, the variation of the on-resistance of the switch is checked, and an indication on the ageing, before the occurrence of a sharp failure, is provided if the value of this resistance becomes abnormally high.

Anyway, double measurement is needed when at least two switches S are combined in one of the composite switches A, B, C or C', as described below.

Figure 2B:
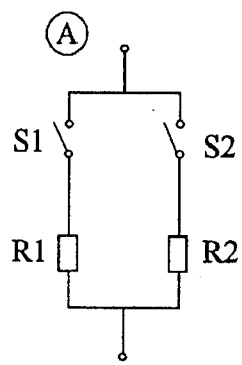
FIGS. 2B and 2C illustrate the detection of a defective switch in a composite switch according to the invention.

FIG. 2B represents two switches S1 and S2, according to the invention, combined in an A-type composite switch. The current in switches S1 and S2 is measured, for example, by measuring the voltages across the respective shunt resistors R1 and R2 which are connected in series with switches S1 and S2.

With this type of composite switch, the control circuit 10 predominantly uses the current measurements to detect a sharp failure. If both switches S1 and S2 are switched on, a substantially equal current flows through resistors R1 and R2, assumed to have an equal value. If one of switches S1 and S2 is on, it is useless, except for checking the variation of the on-resistance of the switch, to measure the voltage across the other switch, since the voltage is substantially the same independently of whether this switch is on or off. If one of the switches is normally on and the other is unduly on, a non-null current is measured in the latter, which triggers detection of its failure by the control circuit 10. Similarly, in the case there is no doubt that a load is connected, if one of the switches is unduly off, the measured current becomes zero, which also triggers detection of failure.

Figure 2C:
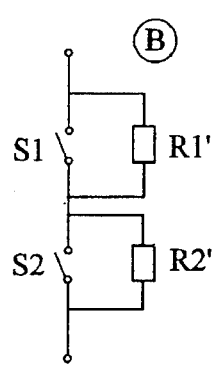
Figure 4A:
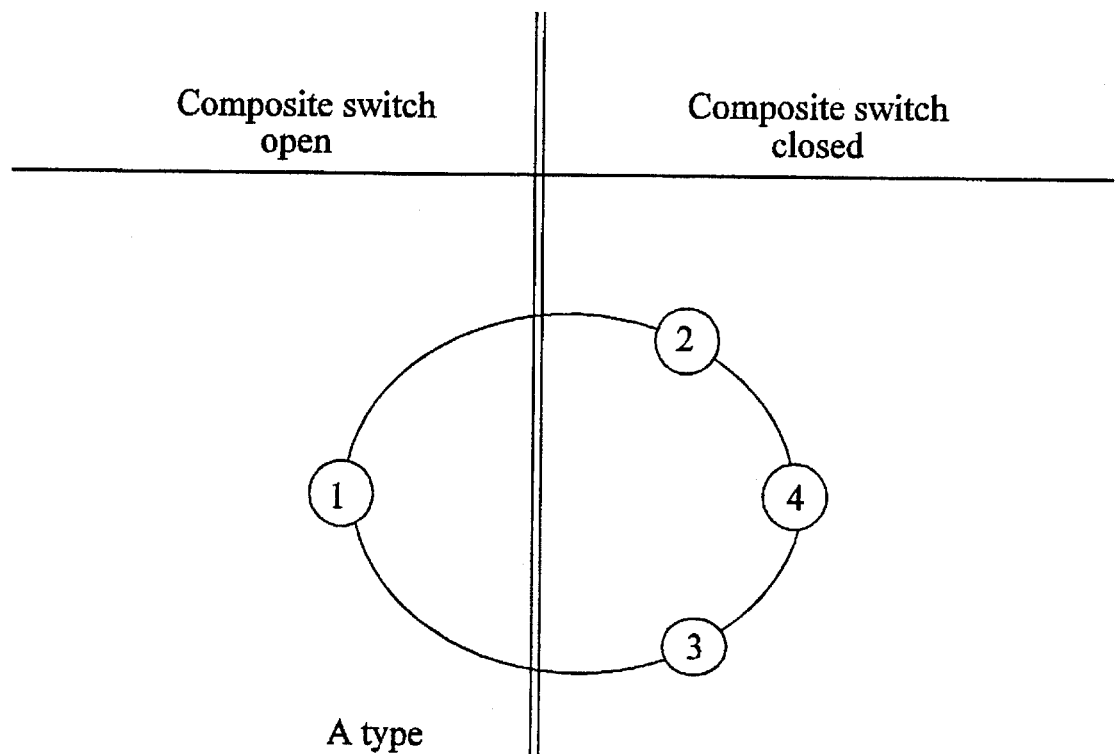
FIGS. 4A–4D are transition diagrams corresponding to the composite switches of FIGS. 1A–1D.
Figure 4B:
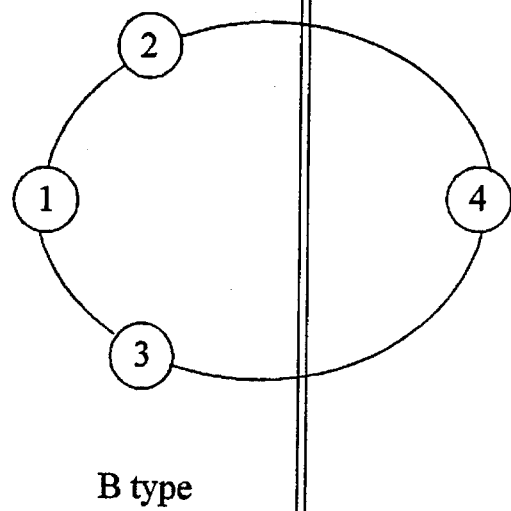
Figure 4C:
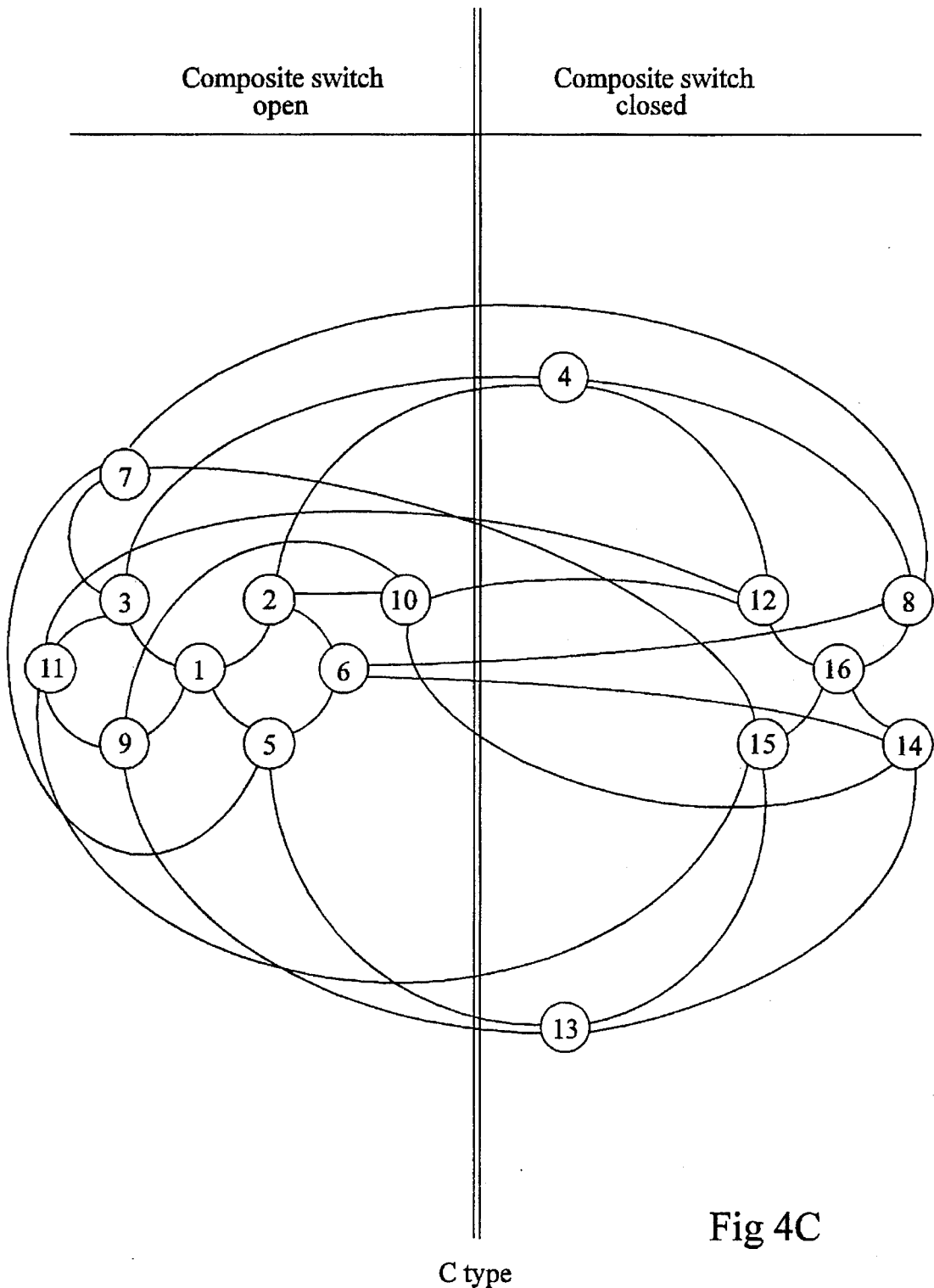
Figure 4D:
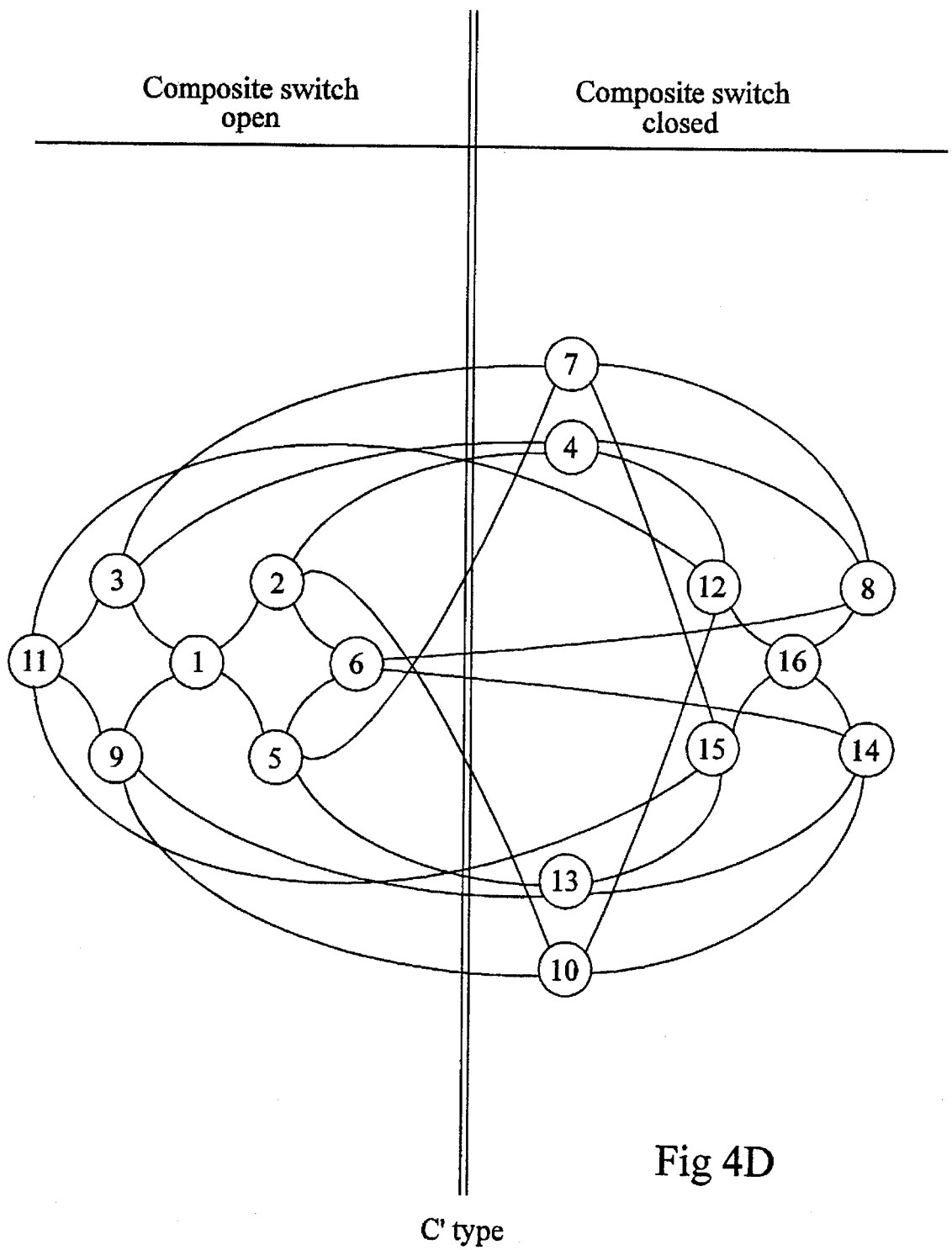

FIG. 2C represents a B-type composite switch in which the voltage measurements across the terminals of the switches are preferably processed to detect a sharp failure. Each switch S1 and S2 includes, in addition to element U for measuring the corresponding voltage, a respective resistor R1' and R2' connected between its terminals. The values of resistors R1' and R2' are high enough so that the load controlled by the composite switch is not impaired when one of switches S1 and S2 is off.

If switches S1 and S2 are off, the voltage across each resistor R1' and R2' is equal to one half of the supply voltage, assuming that the resistors R1' and R2' have the same value. Thus, if one of the switches is unduly on, the voltage across its terminals is cancelled, whereby its failure is detected. Similarly, when there is no doubt that a load is connected, if one of the switches is unduly off, the voltage across its terminals becomes high, which also triggers the failure detection.

In each of the composite switches of the C and C'-type, the voltage or current measurement is used depending upon the states of the simple switches S.

In all the configurations where switch C is off, all its switches S can be statically individually checked by measurement of the voltage.

If only one of the branches S1/S2 and S3/S4 of the composite switch C is on, the switches of the switched on branch can be statically individually checked by measurement of the voltage. To ensure accurate checking, the branch assumed to be off is previously checked by measurement of the current. The switches of the off branch cannot be statically individually checked.

In all the configurations in which composite switch C' is on, all switches S can be statically individually checked by measurement of the current.

If at least one switch S is on in a first pair S1/S3 and S2/S4, switches S of the second pair can be statically individually checked by measurement of the current. To ensure accurate checking, the first pair of switches is previously checked by measurement of the voltage of one of the switches of this pair. The switches of the first pair cannot be statically individually checked.

FIGS. 3A–3D, considered to be part of the present disclosure, are tables representing the various states of the composite switches A to C', respectively, as a function of all the combinations of states of the simple switches S constituting the composite switches.

In the first columns of the table, a number is assigned to each possible configuration of the composite switch, i.e., to each possible combination of states of switches S. The second column indicates the states of the composite switches, the other columns indicate the states of the simple switches S. An on state is represented by one 1 and an on state by a 0.

For switches A and C', there is a higher number of configurations in which the composite switches are on than configurations in which they are off. This indicates the switching-on priority of these composite switches. Similarly, for the composite switches D and C, there is a higher number of configurations in which these switches are off than configurations in which they are on. This indicates the switching-off priority of the composite switches.

FIGS. 4A–4D, also considered to be part of the present disclosure, represent transition diagrams of composite switches A to C'. The left column represents configurations in which the switches are off, and the right column represents configurations in which switches are on. These configurations are represented by the number they have in the first columns of FIGS. 3A–3D. A configuration is linked to another by a line when it is sufficient to switch only one simple switch to switch from one to the other of these linked configurations.

This type of representation is useful to achieve the control of a composite switch so as to individually check its simple switches at the switching-on and switching-off, as described hereafter.

The present invention achieves test sequences without perturbating the controlled load, i.e., some of the simple switches S (or all switches) can be checked at the switching-off and switching-on without causing a supplied load to be unsupplied or an unsupplied load to be supplied.

Figure 5:
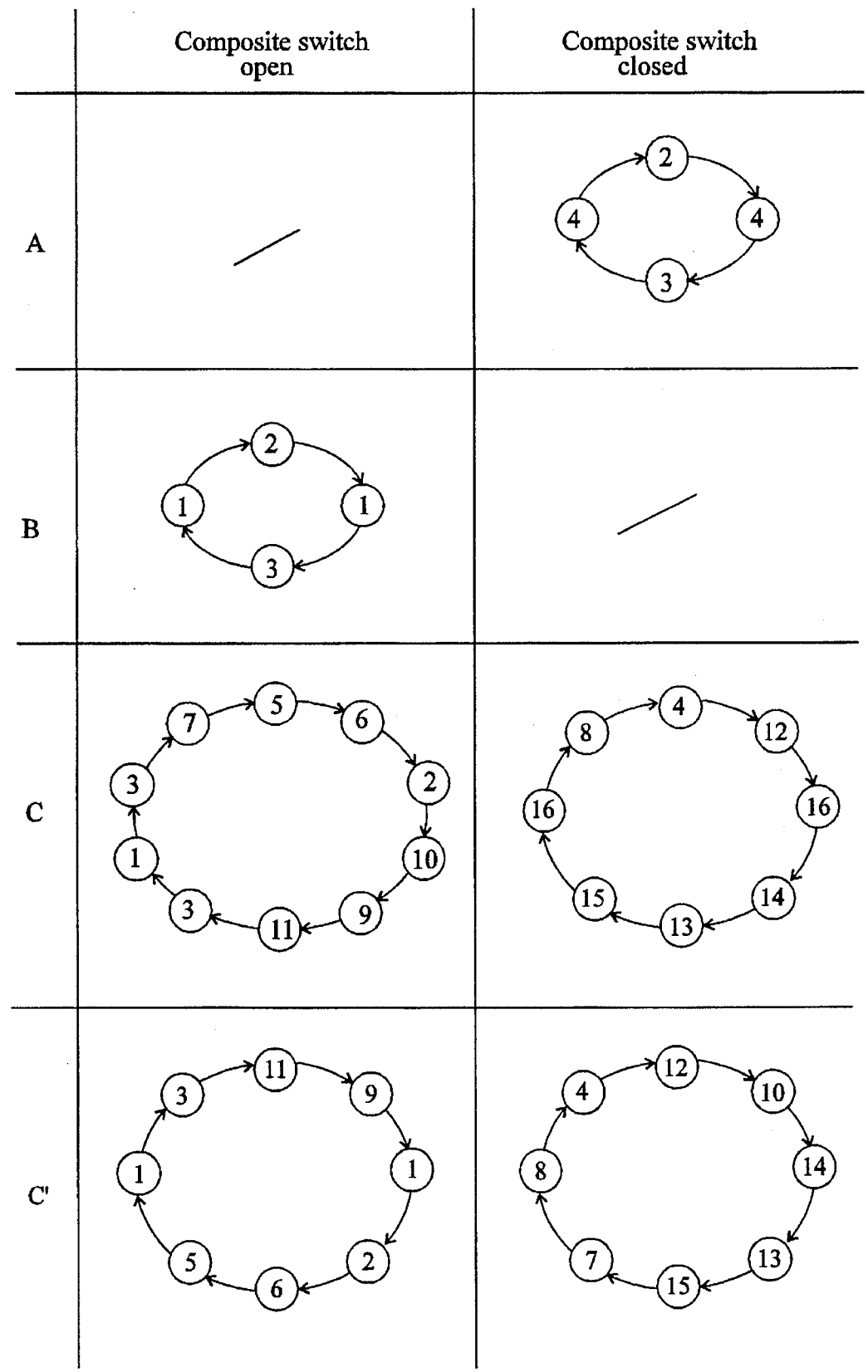
FIG. 5 is a table including examples of non perturbating test sequences of the composite switches of FIGS. 1A–1D.

FIG. 5 represents a table of exemplary complete test sequences that can be achieved in each of the composite switches A to C'. The left column represents exemplary test sequences achieved when the composite switch is off, and the right column represents exemplary test sequences achieved while the composite switch remains on. Different configurations represented by the number of the corresponding tables, are linked by arrows indicating the steps for switching from one configuration to the other.

These non-perturbating test sequences are, for example, periodically achieved, as soon as allowed by the state of the composite switch, by a computer controlling switches S and reading and analyzing signals ERR provided by the corresponding control circuits 10.

In the composite switch A, all switches S cannot be fully tested without supplying the load. In contrast, all switches S can be fully tested while the load is permanently fed. In this case, the composite switch is tested by achieving the sequence 2, 4, 3, 4 (these numbers corresponding to the configurations of the table of FIG. 3A).

Similarly, the composite switch B cannot be fully tested when it is permanently on; however, it can be tested when it is permanently off. In this case, the sequence 1, 2, 1, 3 is achieved (these numbers corresponding to the configurations of the table of FIG. 3B).

Each composite switch C and C' can be fully tested in the permanently off or permanently on state. The sequences represented in FIG. 5, to be considered as being part of the present disclosure, are only given by way of example among many other possibilities. By associating several switches, such as the one of FIG. 2A, the measuring elements U and I become redundant, thus compensating for possible failures of the measuring components. In a composite switch A, for example, the voltage measurement across the terminals of the simple switches S is achieved either by the element U of switch S1 or by the element U of switch S2. The same operation is possible for components I which measure the current in the composite switch B.

Although the present invention has been described in connection with four preferred composite switches, it also applies to different composite switches including more than four simple switches.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

We claim:

1. A composite switch including at least two series of single switches connected between two terminals of the composite switch, wherein the states of the single switches are separately controllable by respective control signals and each single switch comprises:

a voltage measuring element for providing a signal representative of the voltage across the single switch;

a current measuring element for providing a signal representative of the current in the single switch;

a high value resistance connected across the single switch; and a control circuit receiving the signals of the voltage and current measuring elements and the control signal, for providing an active failure signal when the signal of the voltage measuring element exceeds a high voltage threshold or the signal of the current measuring element is below a low current threshold while the control signal determines an on-state of the single switch, or when the signal of the voltage measuring element is below a low voltage threshold or the signal of the current measuring element exceeds a high current threshold while the control signal determines an off-state of the single switch.

2. The composite switch of claim 1, wherein the failure signal is active only when the signal of the current measuring element exceeds the high current threshold while the control signal determines an off-state of the single switch or when the signal of the voltage measuring element exceeds the high-voltage threshold while the control signal determines an on-state of the single switch.

3. A method for testing a composite switch including at least two series of single switches connected between two terminals of the composite switch, wherein the states of the single switches are separately controllable by respective control signals and each single switch comprises a control signal for controlling the state of the switch;

a voltage measuring element for providing a signal representative of the voltage across the single switch;

a current measuring element for providing a signal representative of the current in the single switch;

a high value resistance connected across the single switch; and a control circuit receiving the signals of the voltage and current measuring elements and connected to the control signal, for providing an active failure signal when the signal of the voltage measuring element exceeds a high voltage threshold or the signal of the current measuring element is below a low current threshold while the control signal determines an on-state of the single switch, or when the signal of the voltage measuring element is below a low voltage threshold or the signal of the current measuring element exceeds a high current threshold while the control signal determines an off-state of the single switch;

wherein the method comprises the steps of testing each of said single switches by switching it on and off, and analyzing the state of the corresponding failure signal, while other of said single switches are placed in states that ensure a desired state of the composite switch.

4. The method of claim 3, comprising, when the composite switch should remain on, testing the single switch while said other single switches are on and connected in series between the two terminals of the composite switch.

5. A composite switch including at least two series connected single switches whose states are separately controllable by respective control signals, wherein each single switch comprises:

a voltage measuring element for providing a signal representative of the voltage across the single switch;

a high value resistance connected across the single switch; and a control circuit receiving the signal of the measuring element and the respective control signal, for providing an active failure signal when the signal of the voltage measuring element exceeds a high threshold while the control signal determines an on-state of the single switch, or when the signal of the voltage measuring element is below a low threshold while the control signal determines an off-state of the single switch.

6. The composite switch of claim 5, wherein the failure signal is active only when the signal of the voltage measuring element exceeds the high threshold while the control signal determines an on-state of the single switch.

7. A method for testing a composite switch including at least two series connected single switches whose states are separately controllable by respective control signals, wherein each single switch comprises a voltage measuring element for providing a signal representative of the voltage across the single switch;

a high value resistance connected across the single switch; and a control circuit receiving the signal of the measuring element and the respective control signal, for providing an active failure signal when the signal of the voltage measuring element exceeds a high threshold while the control signal determines an on-state of the single switch, or when the signal of the voltage measuring element is below a low threshold while the control signal determines an off-state of the single switch;

wherein the method comprises the steps of testing each of said two single switches by switching it on and off, and analyzing the state of the corresponding failure signal, while the other single switch is off, whereby the composite switch remains off during testing.

8. A composite switch including at least two single switches connected in parallel, whose states are separately controllable by respective control signals, wherein each single switch comprises:

a current measuring element for providing a signal representative of the current in the single switch; and a control circuit receiving the signal of the measuring element and the control signal, for providing an active failure signal when the signal of the current measuring element exceeds a high threshold while the control signal determines an off-state of the single switch, or when the signal of the current measuring element is below a low threshold while the control signal determines an on-state of the single switch.

9. The composite switch of claim 8, wherein the failure signal is active only when the signal of the current measuring element exceeds the high threshold while the control signal determines an off-state of the single switch.

10. A method for testing a composite switch including at least two single switches connected in parallel, whose states are separately controllable by respective control signals, wherein each single switch comprises a current measuring element for providing a signal representative of the current in the single switch; and a control circuit receiving the signal of the measuring element and the control signal, for providing an active failure signal when the signal of the current measuring element exceeds a high threshold while the control signal determines an off-state of the single switch, or when the signal of the current measuring element is below a low threshold while the control signal determines an on-state of the single switch;

wherein the method comprises the steps of testing each of said two single switches by switching it on and off, and analyzing the state of the corresponding failure signal, while the other single switch is on, whereby the composite switch remains on during testing.

11. The method of claim 3, comprising, when the composite switch should remain off, testing the single switch while at least one other single switch is off in each of said series of single switches.

* * * * *